S. Slocum.
Papering Pins.
No. 332. Reissued Dec. 4, 1855.
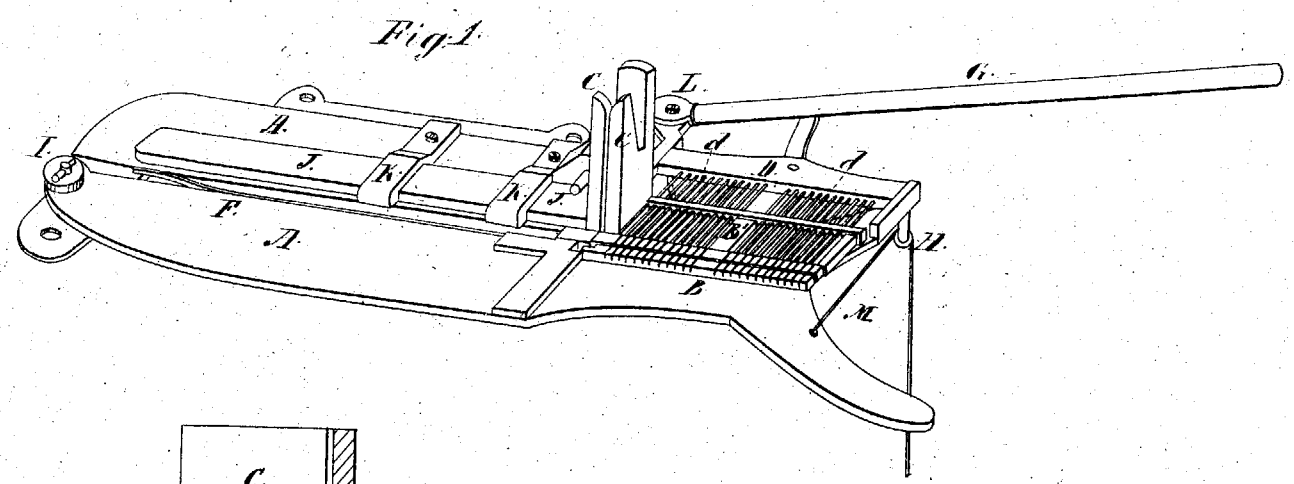
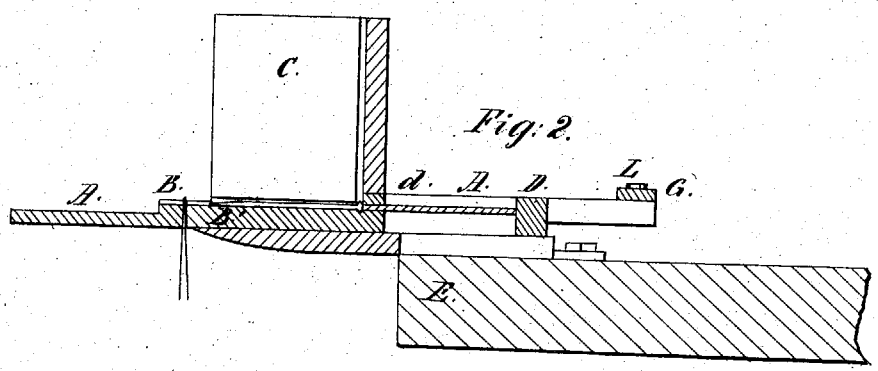
Witnesses
John S. Slocum
Amos W. Wilton
Inventor:
Samuel Slocum

UNITED STATES PATENT OFFICE.

SAMUEL SLOCUM, OF PROVIDENCE, RHODE ISLAND.

MACHINE FOR STICKING PINS IN PAPER.

Specification forming part of Letters Patent No. 2,275, dated September 30, 1841; extended 7 years; Reissue No. 332, dated December 4, 1855.

*To all whom it may concern:*

Be it known that I, SAMUEL SLOCUM, now of Providence, in the State of Rhode Island, have invented a new and useful Improvement in Machines for Sticking Pins into Papers; and I do hereby declare that the following is a full, clear, and exact description thereof, reference being had to the accompanying drawings, making part of this specification, in which—

Figure 1 is a perspective view, and Fig. 2 a cross-vertical section, full size.

The same letters indicate like parts in the two figures.

Prior to my invention pins were stuck into papers in rows by hand. The paper was previously crimped and then put in a clamp and there held while the operative inserted the pins, the edge or surface of one of the bars or jaws of the clamp being slightly grooved at given distances apart to determine the spacing of the pins in a row. This mode of operation was slow, expensive, and the certainty of the operation depended entirely on the skill and attention of the operative. The object of my invention was to reduce the time, labor, and expense of sticking pins, and at the same time to render the operation more accurate and certain.

By the mode of operation of my said invention the pins, supplied in any suitable manner, descend by gravity in a row through or along a channel-way formed between two guides, and they are separated laterally from the lower end of this channel-way by a grooved or notched instrument, which receives one pin at a time, the surface of the said instrument beyond the groove or notch acting as a stop to prevent the descent of the column until a groove or notch again comes in line to receive another pin. The pins thus separated from a pile are then each forced from a groove, notch, or channel by a follower into the folds or crimps of the paper held by a suitable clamp, the groove, notch, or channel acting as a guide to direct the pin during the operation of transferring and sticking it into the paper.

The mode of application of the principle of my invention which I have adopted is represented in the accompanying drawings, in which A A represent the two jaws of a clamp. One of these jaws is fixed and secured to a bench or frame, E E, and the other moves on a joint pin, I.

A spring, F, is interposed between the two for the purpose of separating them, and they are brought together by a cord, M, attached to the movable jaw and passing over a pulley, H, attached to the fixed jaw, and thence extending down to a treadle by which the operator can either close the jaws or permit the spring to open them. Where the two jaws come together they are each formed with or have a bar attached to them forming the two faces of a clamp, as at B B′. The upper surface of these two bars are formed with parallel grooves at right angles with their faces, and the grooves are at such distances apart as to correspond with the intended distance between the pins when stuck into rows in the paper; and those in the bar B′ are of such depth and width as to receive each one pin and guide it during the after operation of sticking, and those in the bar B may be of less depth and width, and, in fact, they may be dispensed with altogether if the paper in which the pins are to be stuck is stiff, as the only purpose of the grooves in this bar is to leave the projecting metal between the grooves the better to sustain the paper during the operation of sticking.

The grooves in the bar B′ may be narrower for a short distance from the clamping surface than where the pins are deposited, as in that case the guiding-operation will be more perfect.

On the upper surface of the fixed jaw A there is a sliding bar, J, working in ways K K, so that it can be made to slide back and forth over that part of the surface of the bar B′ which is grooved to the greatest depth; and at the forward end of this bar, J, there are two guides, C C, with a channel-way between them of sufficient length and breadth to receive a pin in a horizontal direction and allow it to slide up and down thereon freely. The lower end of the two guides are on a level with the upper grooved surface of the bar B′, so that they can slide over it freely to deposit the pins in the several guide-grooves. Back of the grooved bar B′ there is a plate, D, provided with followers *d*, which slide in the guide-grooves, and this plate is adapted to sli s toward and from the jaws by a lever, G, that turns on a fulcrum pin, L, and jointed by a link with the middle of the length of the plates.

The pins in sufficient quantity are supplied in any suitable manner to the guide channel-way between the guides C C, all lying one above another with the heads in one direction. The sheet or strip of paper, suitably crimped or folded, is placed between the jaw-bars B B′ of the clamp and there clamped and held during the sticking operation. The hopper-like guides C C are then drawn over the grooved bar B′, by which one pin is deposited in each of the grooves, the surface of the said bar B′ between the several grooves preventing the pins in the channel-way from descending in passing from one groove to another. The plate D, with its followers, is then moved toward the paper held in the clamp, by which the pins are forced into the crimps or folds of the paper to the depth required. The plate D is then moved back, the jaws opened, the paper shifted and reclamped, and the operation repeated.

The number of guide grooves or notches in the bar B′ and the number of followers may be varied at pleasure from one upward, as each groove, with its follower in connection with the clamp for holding the paper, performs a complete operation so far as regards the guiding of the pin as it is forced by the follower into the crimps or folds of the paper held in front, and all the successive grooves and followers are mere duplications of the first. By reason of the combined action of the channel-way for the pins between the two guides, C C and the grooved or notched plate the pins are separated one by one from the pile as they descend by gravity, the space beyond each groove or notch acting as a stop to prevent the farther descent of the pile until that groove or notch or another is brought under the channel-way to receive another pin.

And, finally, it will be seen that, by reason of the lateral discharge of the pins one by one from the pile, the separation is effected without any danger of the projecting heads catching on each other, which would injure the pins, if it did not entirely destroy the efficient action of the machine. In this way I have been enabled effectually and with accuracy and rapidity to separate the pins one by one from a pile, to determine the spaces between the several pins in a row, to hold the crimped or folded paper, and to insert the pins therein to the required depth and at the required distances apart.

And although the above-described construction is the only mode of application which I have devised of the principle or mode of operation which I claim as my invention, it will be obvious that the same mode of operation resulting from the novel combination of mechanical actions specified may be variously modified by the substitution of mechanical equivalents having the same mechanical action and in combination resulting in the same mode of operation.

What I claim as my invention, and desire to secure by Letters Patent, is—

1. Separating the pins laterally one by one from the lower end of a pile, sliding by gravity between guides, by combining with such channel-way between guides a grooved or notched instrument, substantially as described, so that when the groove or notch is brought in the line of the channel-way the lowest pin of the pile shall enter the groove or notch, and by the lateral motion separate it from the pile without any conflict of the heads, the surface of the said instrument beyond the groove or notch acting as a stop to prevent the farther descent of the pile until a groove or notch be again brought in line, substantially as set forth.

2. The channel-way between guides for the descent of the column of pins by gravity, substantially as described, in combination with one or more guide grooves and one or more followers working in the said guide grooves, substantially as described, whereby the pins, after being separated, can be transferred as described.

3. In combination with one or more guide-grooves and one follower connected therewith, substantially as described, for guiding the pin or pins as pushed forward, the employment of a clamp or holder for clamping or holding the paper in the required position during the operation of inserting the pin or pins.

4. The combination of the channel-way for the column of pins between guides, the guide groove or grooves, or notches, the follower or followers, and the clamp or equivalent therefor, substantially as and for the purpose specified.

SAMUEL SLOCUM.

Witnesses:

JOHN H. WEEDEN,
S. B. WEEDEN.